Patented July 10, 1951

2,560,425

UNITED STATES PATENT OFFICE 2,560,425

BETA-TETRAHYDROFLUORANTHOYL PROPIONIC ACID AND SALTS THEREOF

Otis E. Fancher, Elkhart, Ind., assignor to Miles Laboratories, Inc., Elkhart, Ind., a corporation of Indiana No Drawing. Application March 20, 1951, Serial No. 216,661

7 Claims. (Cl. 260—515)

This invention relates, generally, to synthetic choleretics and methods of preparing the same.

Dehydrocholic acid has for sometime past been used as a therapeutic agent in the treatment of biliary diseases. The sodium salt can safely be injected intravenously.

However, the practical source of dehydrocholic acid is ox bile, and it is from this material that this therapeutic agent is made in quantity. The nature of the source and the rather complicated method of processing it required to produce a sufficiently pure product makes the dehydrocholic acid rather expensive.

The object of the present invention, generally stated, is the provision of synthetic choleretics which are equal or more effective in producing bile flow than is sodium dehydrocholate.

This application is a continuation-in-part of my copending application, Serial No. 11,331, filed February 26, 1948.

It has been found that compounds of the following general formula, usually in the form of the sodium salt, are effective choleretics:

wherein, Ar is an aromatic radical of the group consisting of fluoranthyl and tetrahydrofluoranthyl and $n$ is either 2 or 3.

These compounds may be suitably prepared according to the following general equation:

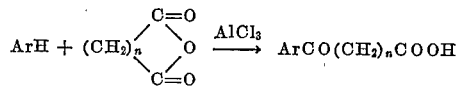

The following specific examples will serve to illustrate the preferred embodiments of the invention:

*Example I.—β-Fluoranthoylpropionic acid*

50 g. of fluoranthene and 26 g. of succinic anhydride in 500 cc. of nitrobenzene were treated at 0°–5° C. with 75 g. of anhydrous aluminum chloride. The temperature was held at 0° C. for four hours and then allowed gradually to come to room temperature. The reaction mixture was allowed to stand for 16 hours. The reaction mixture was then worked up. In so doing, the reaction mixture was decomposed with dilute HCl, the nitrobenzene was removed by steam distillation and the residue after filtration was dissolved in hot sodium carbonate solution and filtered free of a small amount of non-acidic material. Precipitation from solution with HCl gave a light yellow product which crystallized from a 50–50 mixture of dioxane-alcohol as fine platelets which melted at 192–194° C. and showed a neutral equivalent of 308 which corresponds closely to the theoretical value of 302 for β-fluoranthoylpropionic acid.

25 g. of the crude acid was dissolved in 100 cc. of water containing 13 g. of sodium carbonate. On cooling a thick syrup was obtained. On dilution to one liter precipitation started and after standing 16 hours, the solid which separated was filtered (filtrate treated as below), suspended in water, acidified with HCl and filtered. Crystallization from alcohol gave a light yellow material melting at 199–200° C. and having a neutral equivalent of 303.

The filtrate mentioned above, upon acidification thereof with HCl gave a darker acid which melted over a wide range, but had a neutral equivalent which also corresponds to that of β-fluoranthoylpropionic acid. This crude acid and the purified product melting at 199–200° C. produce essentially the same high degree of choleresis in dogs.

Apparently, the β-fluoranthoylpropionic acid exists as the two following position isomers, both of which are effective choleretics:

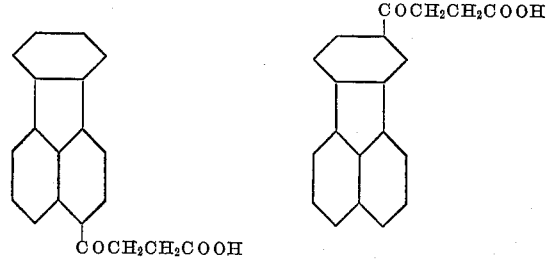

*Example II.—β-(1,2,3,10b-tetrahydrofluoranthoyl-) propionic acid*

20.5 g. of tetrahydrofluoranthene (prepared by reducing fluoranthene by known methods) and 10.5 g. of succinic anhydride in 250 cc. of nitrobenzene were treated at 0° C. with 31 g. of anhydrous aluminum chloride. The temperature was maintained at 0° C. for four hours and the reaction mixture was then allowed to stand overnight in a refrigerator. The reaction mixture was then worked up in the usual fashion (e. g. see Example I) and the resulting product was an acid which by crystallization from alcohol was separated into two fractions:

I. M. P., 190–192° C. Neutral equivalent, 308
II. M. P., 165–190° C. Neutral equivalent, 309

Both of these fractions showed a high order of choleretic activity in dogs. It appears that the two fractions are position isomers of the following structures:

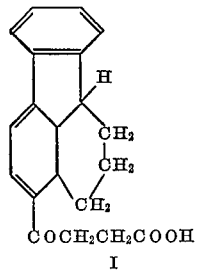 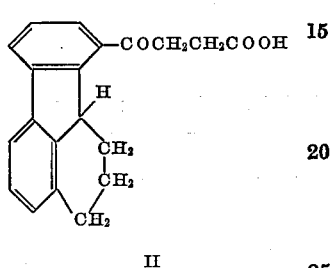

I II

Conversion of the aforesaid crude acid to the methyl ester by treatment with methanolic hydrogen chloride, yields a crystalline methyl ester melting at 119°–120° C. and a liquid methyl ester in the ratio of about 3:1.

Hydrolysis of the crystalline ester by refluxing with alcoholic KOH gives B-4-(1,2,3,10b-tetrahydrofluoranthoyl)-propionic acid (I) melting at 191–192°, and similar treatment of the liquid ester yields B-10-(1,2,3,10b-tetrahydrofluoranthoyl)-propionic acid (II) melting at 192°–193° C.

*Example III.—γ-Fluoranthoylbutyric acid*

32.1 g. of fluoranthene and 20 g. of glutaric anhydride in 300 cc. of nitrobenzene were treated at 0° C. with 47.5 g. of anhydrous aluminum chloride. Stirring was continued at 0° C. for four hours and then the reaction mixture was allowed to stand in a refrigerator overnight. Working up in the usual manner gave an acid which after crystallization from benzene melted at 164–165°

C. The product produces good choleresis in dogs. Probably the product can exist as the two following position isomers

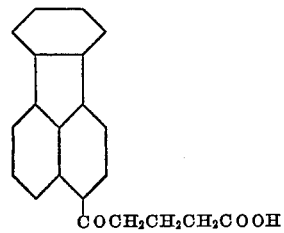

COCH₂CH₂CH₂COOH

COCH₂CH₂CH₂COOH

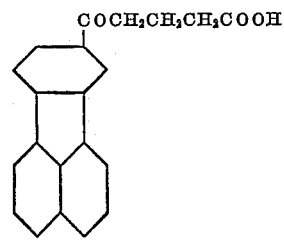

The foregoing compounds are conveniently used in the form of alkali metal salts thereof, preferably as sodium salts, which are made according to well known procedures.

Having fully described the invention, what is claimed as new is:

1. β-(1,2,3,10b-tetrahydrofluoranthoyl) propionic acid and alkali metal salts thereof.
2. β-4-(1,2,3,10b-tetrahydrofluoranthoyl) propionic acid.
3. Alkali metal salts of the compound of claim 2.
4. β-10-(1,2,3,10b-tetrahydrofluoranthoyl) propionic acid.
5. Alkali metal salts of the compound of claim 4.
6. β-(1,2,3,10b tetrahydrofluoranthoyl) propionic acid.
7. The sodium salt of the compound called for in claim 6.

OTIS E. FANCHER.

No references cited.